July 31, 1945.    W. J. SHOLAR    2,380,555
DEHYDRATING APPARATUS
Filed Aug. 19, 1942    4 Sheets-Sheet 1
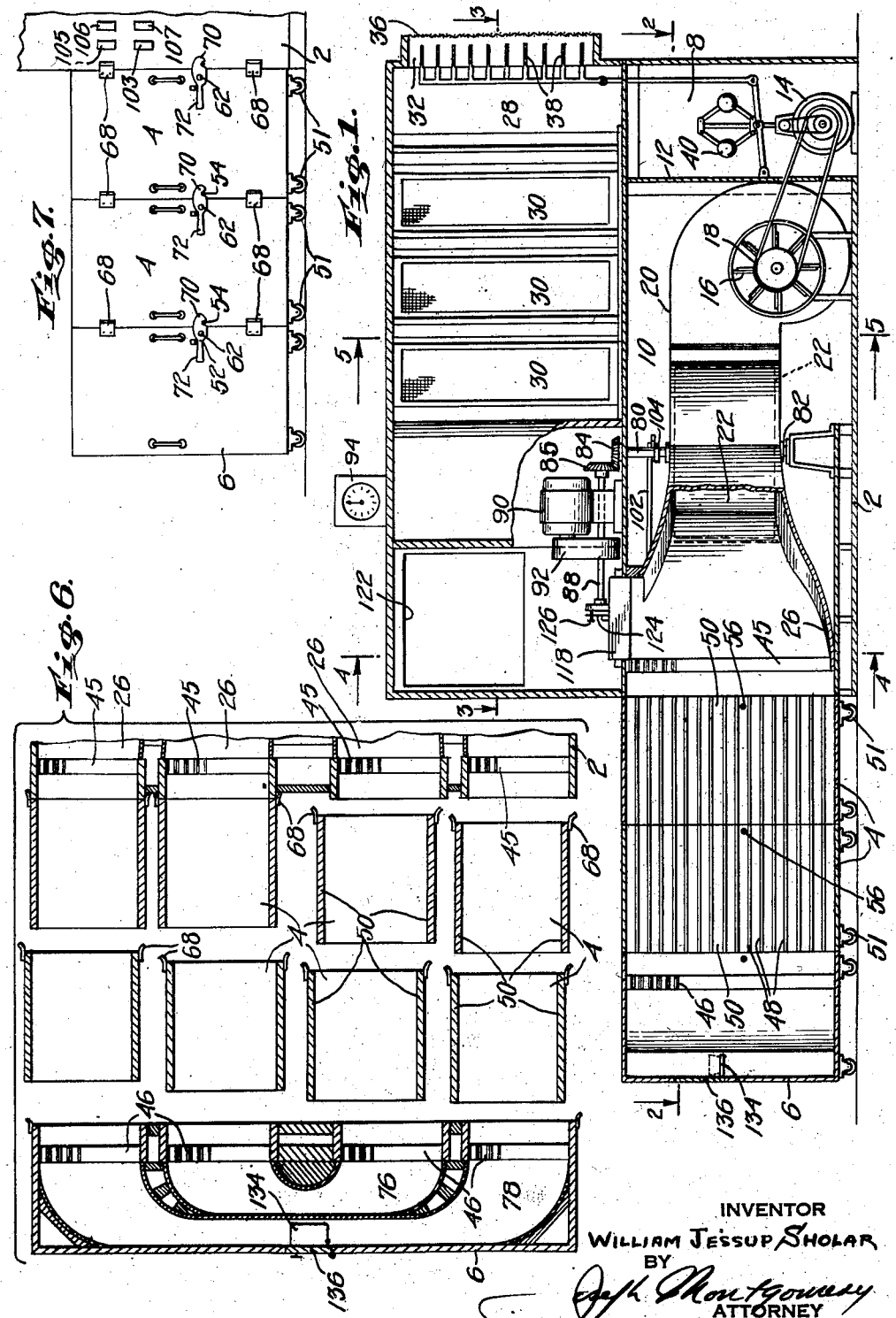
INVENTOR
WILLIAM JESSUP SHOLAR
BY
ATTORNEY July 31, 1945. W. J. SHOLAR 2,380,555
DEHYDRATING APPARATUS
Filed Aug. 19, 1942 4 Sheets-Sheet 2
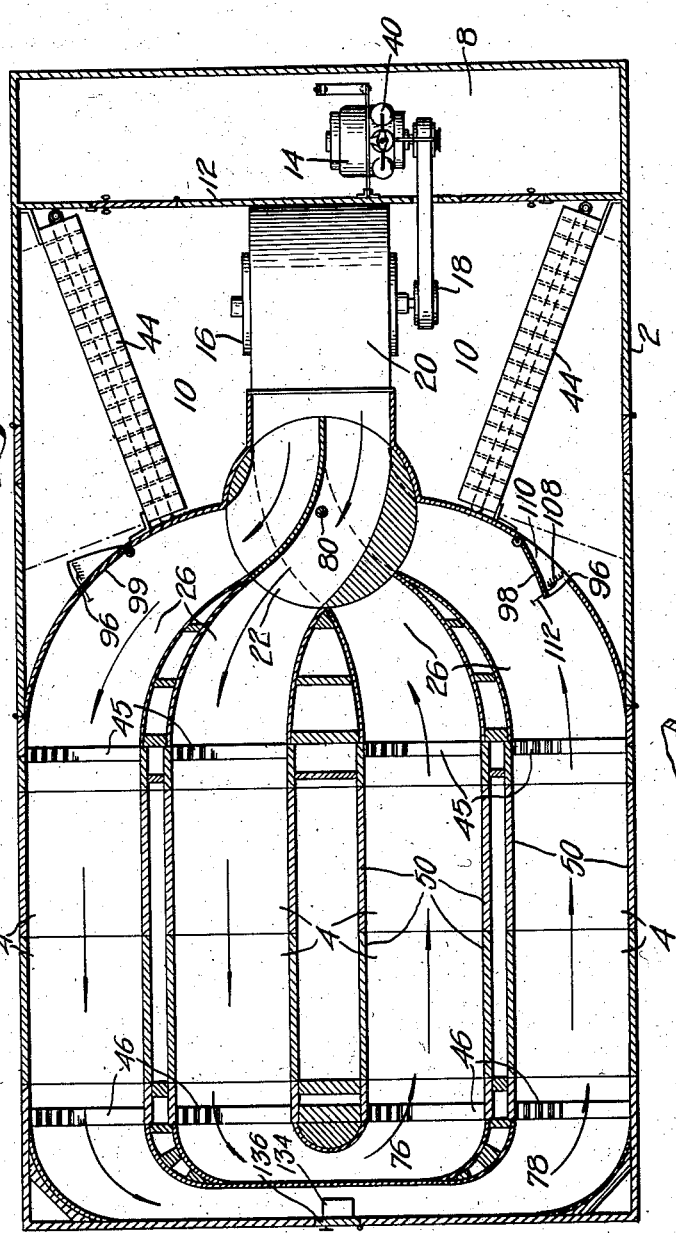
INVENTOR
WILLIAM JESSUP SHOLAR
BY
ATTORNEY July 31, 1945.  W. J. SHOLAR  2,380,555
DEHYDRATING APPARATUS
Filed Aug. 19, 1942  4 Sheets-Sheet 3
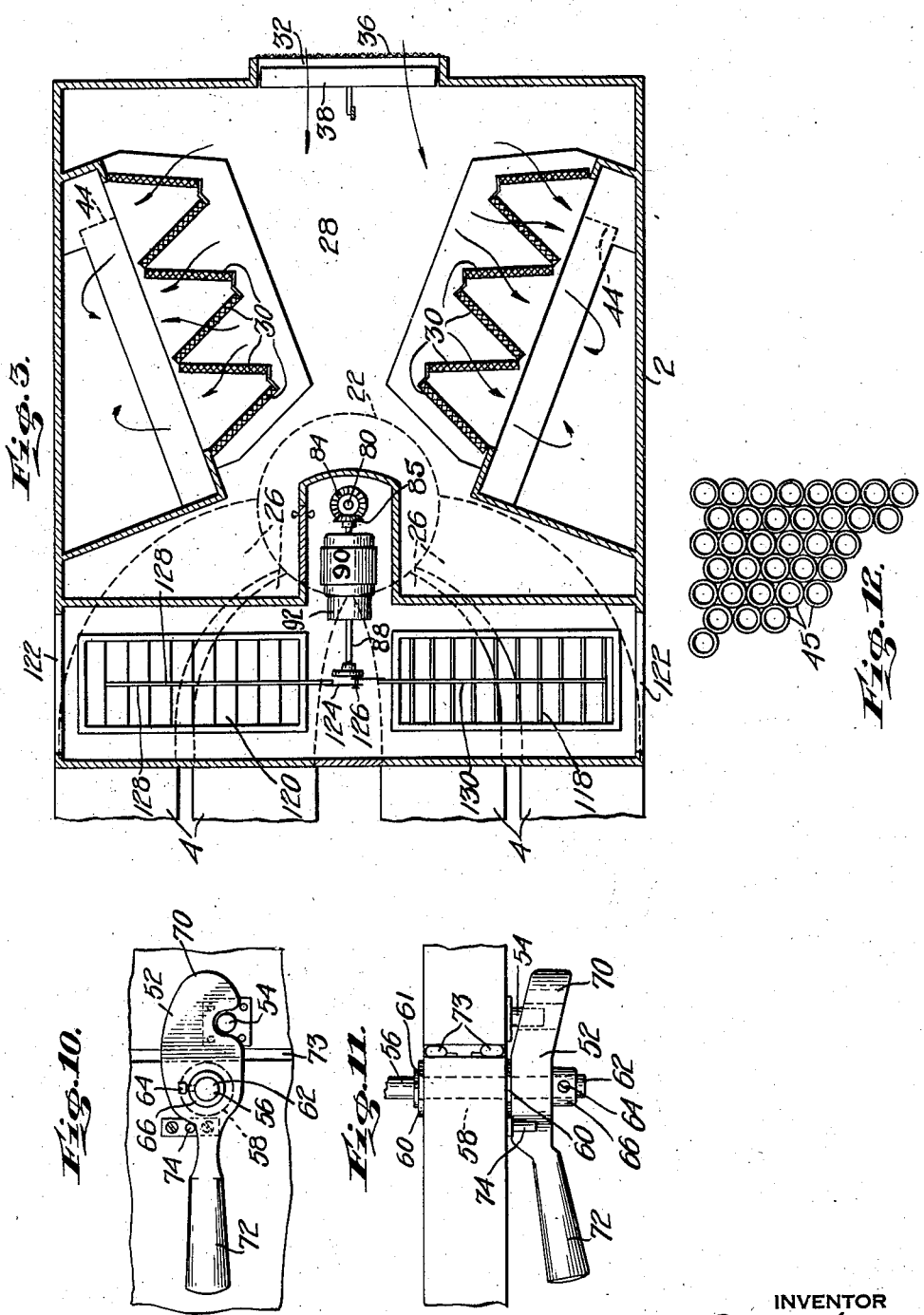
INVENTOR
WILLIAM JESSUP SHOLAR
BY
ATTORNEY July 31, 1945. W. J. SHOLAR 2,380,555
DEHYDRATING APPARATUS
Filed Aug. 19, 1942 4 Sheets-Sheet 4
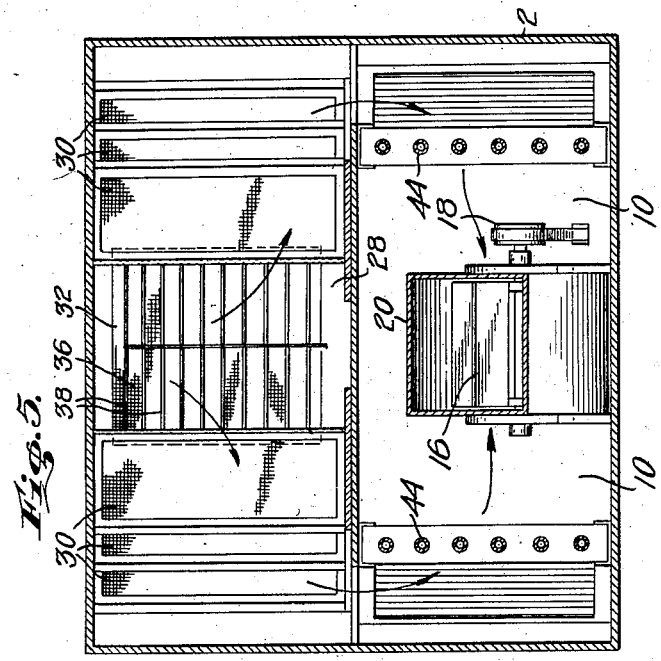
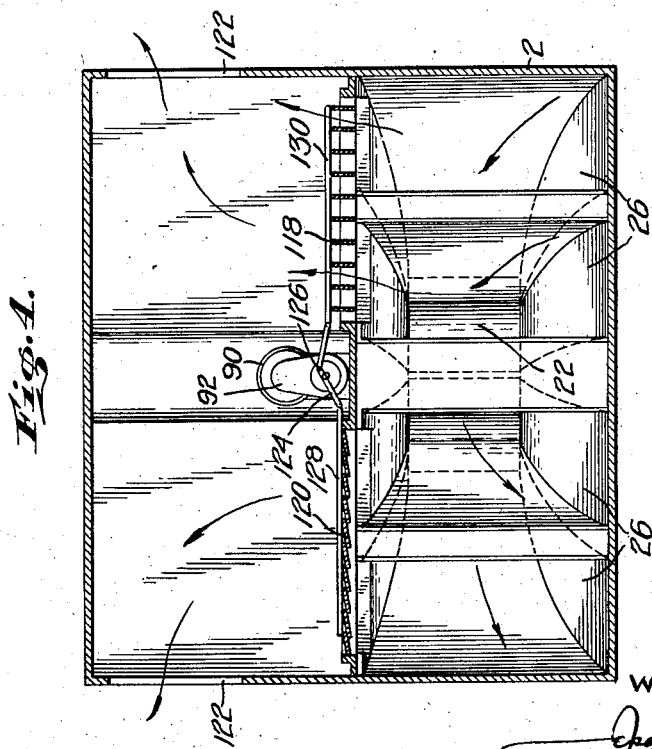
INVENTOR
WILLIAM JESSUP SHOLAR
BY
ATTORNEY Patented July 31, 1945

2,380,555

UNITED STATES PATENT OFFICE 2,380,555

DEHYDRATING APPARATUS

William Jessup Sholar, New Rochelle, N. Y.

Application August 19, 1942, Serial No. 455,289

11 Claims. (Cl. 34—53)

This invention relates to improvements in dehydrating apparatus and is particularly directed to an apparatus for drying, dehydrating or concentrating edible or other products.

Products which are capable of treatment with my improved apparatus include fruit, fruit juices, meats, vegetables, sea foods and other food substances, in solid, liquid or semi-liquid form or similar products wherein it is desired to reduce their water content and consequently their bulk as an aid to their preservation and transportation.

Also to dehydrate to two or three percent moisture content under temperatures less than 120 degrees F., moist amorphous substances such as bakers' or brewers' yeast, prepared custards, and substances of similar consistency, and such fluids as baby foods prepared with fresh milk, zoolak, yougert, kumiss, acidophilous, infusions, emulsions, and fermented liquids, any of which are subject to injury when dried in higher temperatures than 130 degrees F.

One of the objects of the present invention is the provision of an apparatus of the character indicated wherein automatically operable means are provided for circulating the dehydrating medium alternately in opposed directions whereby to equalize the rate of drying.

Another object of the present invention resides in the provision of an apparatus wherein a single blower is employed whereby to direct the dehydrating medium alternately in opposite directions.

Another object of the invention is the provision of an apparatus wherein trucks containing the products to be treated form an integral part of the housing of the apparatus and complements of the passageways for the dehydrating medium, which trucks can readily be moved on their respective casters into and out of communication with the dehydrating medium and whereby the capacity of the apparatus can be varied at will by employing any desired number of trucks.

A further object of the invention is the provision of a mobile header which also forms part of the housing and, like the trucks, is a complement of the passageways whereby to provide communication for the dehydrating medium with the trucks.

A still further object of the invention resides in the provision of means for the automatic control of the volume, pressure, purity, humidity and temperature of the dehydrating medium.

A still further object resides in the provision of means for recirculating part of the dehydrating medium, as may be required to maintain the desired moisture content.

Other objects of the present invention will be manifest from the following description and the accompanying drawings:

In which drawings:

Fig. 1 is a longitudinal vertical sectional view of the apparatus;

Fig. 2 is a view taken on line 2—2 of Fig. 1;

Fig. 3 is view taken on line 3—3 of Fig. 1;

Fig. 4 is a view taken on line 4—4 of Fig. 1;

Fig. 5 is a view taken on line 5—5 of Fig. 1;

Fig. 6 is a plan view partly in section of one end of the apparatus with the parts disconnected;

Fig. 7 is side elevation of the same end of the apparatus with the parts assembled;

Fig. 8 is a detailed view of control mechanism for doors of recirculating passageways;

Fig. 9 is a cross sectional view of one of the recirculating doors;

Fig. 10 is an elevational view of latching mechanism for the sections of the apparatus;

Fig. 11 is a plan view of the latching mechanism of Fig. 10; and

Fig. 12 is an end view of a plurality of tubes in the air circulating path.

Referring to the drawings in detail, the housing for the apparatus comprises a stationary section 2 and movable complementary sections comprising trucks 4 and header 6. It will be noted that the floor level of the section 2, the trucks 4 and the header 6 is the same throughout. The stationary section 2 is divided into upper and lower compartments. The lower compartment comprises a motor chamber 8 and a heating chamber 10 separated from each other by partition 12. A motor 14 in the motor compartment drives a blower 16 in the heating compartment through a pulley 18. The motor 14 preferably is a variable speed motor whereby the rate of flow or pressure of air impelled by the blower may be varied. The blower 16 is contained within a housing 20 communicating with a rotatable air valve 22. The valve is in communication with dual passageways or conduits 26 which in turn are in communication with the interior of the trucks and header as will be more fully described hereinafter.

The upper compartment of the stationary housing 2 includes an air filter chamber 28 having a plurality of air filters 30 mounted therein. One wall of the filter chamber has an air intake opening 32 which is preferably covered with a screen 36. The admission of air through the intake opening is controlled by a plurality of louvers 38 adapted to be opened and closed automatically as by a governor 40 driven by the motor 14 or by any other suitable control mechanism.

Air drawn into the filter chamber through the louvers 38 passes through the filters and thence downwardly through openings in the floor of the filter chamber into the heating chamber 10, the air entering the heating chamber at one side of radiators 44. These radiators may be the conventional fin or convection type of steam heated radiators and are mounted on either side of the blower. The air passing through and/or over these radiators is heated thereby and the heated air is picked up by the blower and impelled through the valve 22 thence through a stack of tubes 45 into the passageways 26. A stack of tubes 46 similar to the stack 45 is mounted in the header 6, both of which stacks serve to break up the air stream and equalize it.

As hereinbefore mentioned the trucks 4 form part of the housing and passageways. These trucks are open at their ends, that is to say they are without end walls. Trays or pans 48 containing the materials to be treated are supported on side walls 50 of each truck in any suitable manner. By reason of the open ends of the trucks the air is free to pass through the trucks, when locked in position, and contact the material or products contained in the trays or pans 48. While I have illustrated eight such trucks in the drawings it is to be understood that four or any multiple of four trucks may be employed. The trucks being mounted on casters 51 are readily movable into and out of position, but when in position they must of necessity be locked to each other in their respective tandem positions, to the header, and to the stationary section in such a manner as to form a passageway for the dehydrating medium used in the dehydration without loss of any of the medium. This I accomplish by means of a latch 52 cooperating with a pin 54, as shown in Fig. 10, the pin being fastened to the outside rear ends of each of the four passageways of the stationary section 2, and to the outside rear of each side of the trucks 4. The said pin is in alignment with the latch 52 mounted on the outside front ends of each truck and to the outside front ends of the header. The latch is fixed to a transverse bar 56 snugly fitting but freely rotatable in a transverse sleeve 58 extending through the side walls of the trucks and threaded at each end sufficiently to permit it to be secured to the walls by nuts 60. The bar 56 extends the full width of the truck and through the latches on each side of the truck, and is fastened securely thereto by a set screw 64 passing through the extension 66, which is part of the casting.

When a truck is rolled into line and is eased into exact position by metal guides 68 bent outwardly on front of the side walls of the truck and header the pins 54 engage the cam face on the head of the latch whereby to raise the same on both sides of trucks and stationary section and slide into notches in head 70 of latches, the head being heavier than the handle 72. Consequently the heads fall on and engage pins on both sides of truck and header. The two latches (one on each side of truck) being fastened securely to the bar 58 act at the same time automatically. When it is desired to detach trucks, the handle 72 of the latch on the near side of truck is depressed by hand and the same are released on both sides of truck. As truck is rolled out, the head 70 of latches fall into former position, the distance being fixed by a limiting or stop pin 74 fastened to the side wall of housing.

To prevent air from entering or escaping from the apparatus I provide gaskets 73 preferably of rubber fastened to front ends of walls of trucks and header.

The header 6 as previously mentioned also forms an integral part of the housing and passageways and has arcuate passageways 76 and 78 in communication with the interior of the trucks as shown in Fig. 2.

It will be appreciated from the description thus far given that air entering the filter chamber passes through the filters 30 where impurities are removed, thence through the radiators 44 where the air is heated and is then picked up by the blower 16 and directed through the valve 22 and the tubes 45, where the same is broken up and thence through the passageways, trucks and header for treatment of the products returning to a point adjacent to the valve 22 to complete the circuit. When the air completes its circuit part is recirculated and part exhausted as will be explained presently. With the valve 22 in the position illustrated in full lines in Fig. 2 the air is circulated through the passageways in an anticlockwise direction as viewed in Fig. 2. In order to reverse the direction of flow of air the valve is rotated to the dotted line position shown in Fig. 2. With the valve in this position the air is circulated through the passageways in a clockwise direction as will be readily understood.

This reversal of direction of flow of the air through the passageways in contact with the materials being treated results in an equalization of the rate of drying.

It being desirable that this reversal of direction of the air be carried out periodically I accordingly have provided automatic means whereby to accomplish that end.

The rotatable valve 22 is fixedly mounted on a shaft 80 revolving against a thrust type ball bearing 82. The upper end of the shaft 80 is provided with a bevel gear 84 meshing with another bevel gear 86 on a shaft 88 driven by a reversible motor 90 through pulley 92. The operation of the motor 90 is controlled by clock mechanism 94 in the conventional manner. Should it be desired to reverse the direction of the flow of air through the passageways every hour for example the clock mechanism is set whereby the motor will be driven once each hour for a short period to rotate the valve 22 one third of its perimeter whereby to bring the ports in the valve into register with the desired ends of the passageways.

In other words, the motor drives the shaft 88 which in turn drives shaft 80 whereby to rotate the valve 22 from the full line position to the dotted line position in Fig. 2. The valve will remain in this position for one hour for example when the motor again will be set in operation by the clock mechanism 94 whereby to rotate the valve to its original position to complete one cycle of operation. It is to be understood that while I have mentioned one hour as the cycle for circulating the air in alternate directions, I do not wish to be limited to any definite period, inasmuch as the period necessarily is determined by the products under treatment and obviously the cycle can be varied as desired by the manual setting of the clock mechanism.

With my improved apparatus, part of the air may be recirculated and part passed out of the exhaust to atmosphere. The air to be recirculated as well as the air to be exhausted must leave the passageways at the end of its circuit. By reason of the air circuit being periodically reversed by rotation of the valve 22 as previously described the end of the circuit of air is necessarily changed from one end of the passageways to the other with each reversal or partial rotation of the valve. I have accordingly provided means, automatically operable upon rotation of the valve, to prevent the air being exhausted or recirculated except at the end of its circuit.

To provide for the recirculation of air, openings 96 and 97 are provided in the walls of the passageways leading to the heating chamber 10. These openings 96 and 97 have automatically operable doors 98 and 99 respectively, one of which is closed upon the opening of the other. As viewed in Fig. 2 the valve 22 is set to circulate the air in a counter clockwise direction and accordingly the door 98 at the end of the air circuit is open to permit the passage of part of air to the heating chamber 10 for recirculation while the door 99 at the beginning of the air circuit is closed to prevent the passage of air to the heating chamber.

When the direction of the flow of air is reversed the door 98 will automatically be closed to prevent passage of air to the heating chamber and the door 99 will be opened to permit of passage of air to the heating chamber for recirculation.

As previously mentioned these doors 98 and 99 are automatically operated upon rotation of the valve 22. To accomplish this automatic operation I provide each door with a link 100 pivoted to a link 102, the links 102 in turn being pivotally connected to a short arm or eccentric 104 fixed on the shaft 80 of the reversal valve 22. It will be appreciated that with this arrangement the door 98 at the end of the air circuit will be opened and the door 99 at the beginning of the circuit will be closed automatically upon rotation of the valve 22 to the position shown in full lines in Fig. 2 and the door 98 will be closed and the door 99 opened upon rotation of the valve 22 to the dotted line position shown in Fig. 2.

The volume of moist air that should be shunted into the heating chambers 10 for recirculation depends upon the humidity of the air as it is drawn into the dehydrator by the blower together with the moisture picked up by that air in passing over the substance that is being dried. In Summer, outdoor air is frequently higher in relative humidity than in Winter. In fact, outdoor air may vary considerably in humidity within a few hours. In order, therefore, to secure and maintain most desirable results in dehydration, especially of certain substances, a close balance or equilibrium must be maintained between dryness and wetness of the air. The guide to that equilibrium is the hygrostat 105 indicating the humidity of outdoor air as it enters air chamber and hygrostat 106 indicating the humidity of the air after picking up moisture from the pans or trays. From the condition of the outdoor air, it will be determined what volume of used air should be shunted into heating chamber for recirculating as a mixture with fresh air.

In addition to the hygrostats 105 and 106 the apparatus is provided with a thermometer 103 for indicating the temperature and a thermostat 107 for controlling the temperature, in the passageways.

In order to regulate the volume of air that should be recirculated in accordance with the condition of the outdoor air at any hour of any day, I have provided an efficient means shown in Fig. 9, which is an enlarged view of recirculating door 98 shown in Fig. 2. Louvers 108 are attached to the door 98 and to the V-shaped top and bottom boards 110 fastened to door 98, and projecting horizontally toward heating chamber 10. A rod 112, pivotally connected to the louvers and passing through the door and a guide tube 114 attached to the door, may be manipulated whereby to adjust the angularity of the louvers whereby to admit the volume of air desired for recirculation. Calibrations may be provided on the rod 112 to indicate the extent to which it may be withdrawn in setting the louvers. The rod may be fixed in adjusted position by means of a thumb screw 116. The door 98 has an opening arc sufficient for maximum volume of air ever required, and that opening is automatically set, as hereinbefore described. The louvers, however, are set by hand for the volume of air needed as indicated by the hygrostats whereby to maintain an equilibrium of moisture in the dehydrating medium. A duplicate arrangement of louvers is provided for the door 99.

The exhaust air is passed out of the apparatus through exhaust louvers in the upper walls of the passageways in the stationary section 2 of the housing. One set of louvers 118 is provided for one passageway and another set 120 for the other passageway as shown in Fig. 3. The exhaust air passing through these louvers is directed out of the apparatus through an exhaust opening 122 in the side wall of the upper section of the housing.

The exhaust air, as previously mentioned, must be taken out of the passageways at the end of the circuit and, inasmuch as the end of the circuit is determined by the direction of flow of air which is reversed periodically as previously described, I have also provided means for automatically operating the louvers alternately to open and close each set with the operation of the valve 22 whereby the air to be exhausted can pass to the atmosphere only at the end of its circuit through the passageways. To accomplish the automatic operation of these louvers I provide the end of the shaft 88 opposite to the bevel gear 85 with a crank 124 having an eccentric pin 126. Rods 128 and 130 pivotally connected to the set of louvers 118 and 120 respectively are pivotally connected to the pin 126 whereby, upon rotation of the shaft 88 to reverse the valve, the louvers at the end of the circuit will be opened and the louvers at the beginning of the circuit will be closed.

As will be understood from the foregoing the time actuated reversible motor 90 operates the reversal valve 22, the recirculating doors 98 and 99 and the exhaust louvers 118 and 120 synchronously whereby when the direction of flow of air is reversed upon the partial rotation of the valve 22 the recirculating door and the exhaust louvers at the end of the air circuit will be opened and the door and louvers at the beginning of the circuit closed.

When the controls previously mentioned have been set and the desired number of trucks 4, loaded with trays or pans of the material to be treated, are moved into position and secured to the stationary housing 2 with the header 6 secured to the end trucks as shown in Fig. 1, as previously described, the starting switch of the motor 14 may be thrown starting the motor and blower and opening the intake louvers 38.

The clock mechanism 94, having previously been set for the desired cycle of operation in one direction, will also be operating and at the end of the predetermined period will drive motor 90 which in turn will operate the reversal valve 22 whereby to rotate the same for one third of its perimeter to change the direction of flow of air. Simultaneously with the rotation of the valve 22 the recirculating doors and the exhaust valves will be actuated as hereinbefore described whereby part of the dehydrating medium will be mixed with the incoming air, heated and recirculated and the remainder of the medium conveyed through the exhaust louvers to atmosphere.

After the apparatus has completed several cycles of operation the material in a test tray or pan 134 may be inspected. This tray is mounted on the inside of a door or window 136 in the end wall of the header 6.

The present invention has manifold advantages over the conventional tunnel drier which consists of a longitudinal tunnel of a fixed length and wherein the trucks are separate from the tunnel structure and drawn into or through the tunnel. In such prior structures the capacity of the tunnel was fixed and in the case of a tunnel built to accommodate say eight trucks for example and the material to be treated on some occasions occupied only four trucks, half of the tunnel would be empty resulting in considerable waste of the dehydrating medium and heat.

In such prior structures air is blown into one end of the tunnel and out of the other resulting in the material in the pans or trays nearest the incoming hot air drying more rapidly than the material in the trays or pans at the other end of the tunnel. Futile attempts have been made to overcome this difficulty by installing a blower at each end of the tunnel with intervening baffles to deflect the air streams before they meet.

This difficulty however has definitely been overcome by the present invention wherein the air circuit is reversed periodically as hereinbefore explained.

Many other advantages of the apparatus of the present invention over prior structures will readily be appreciated by those skilled in this art.

While I have mentioned herein that my improved apparatus is particularly adapted for drying and dehydrating edible products I do not wish to be limited in that application of my apparatus inasmuch as it is equally well adapted for the treatment of many other products, materials and substances such for example as some forms of textiles, leathers and shoes, garments, fine woods, amorphous clays etc. One of the many advantages of my improved apparatus is that in drying materials each substance, solid or fluid, can be handled or treated in accordance with its own nature and characteristic.

Also while I have mentioned air as the dehydrating medium I do not wish to be limited thereto nor to any particular dehydrating medium inasmuch as other mediums may be employed and in fact may be preferred in the treatment of certain products.

It is to be understood that while I have illustrated and described one embodiment of my invention I do not wish to be limited to that precise structure and arrangement as, obviously, changes and modifications may be made therein without departing from the spirit and scope of my invention.

What I claim is:

1. A dehydrating apparatus comprising in combination a housing, an air passageway therein, containers in said passageway for the material to be dehydrated, an air blower in communication with and for impelling air through said passageway, a ported rotary member intermediate the blower and the air passageway, recirculating ports in said passageway providing communication between said passageway and the intake side of said blower, closures therefor, and manually operable means for adjusting said closures whereby to recirculate a predetermined quantity of air and means for rotating said ported member whereby to establish communication between the air blower and alternate ends of the passageway and for simultaneously actuating the closures for said recirculating ports.

2. A dehydrating apparatus comprising in combination a housing, an air passageway therein, means for supporting material to be dehydrated in said passageway, an air blower in communication with and for impelling air through said passageway, a rotary ported valve intermediate said blower and passageway, the setting of said valve determining the direction of flow of air through the passageway, an exhaust port at each end of said passageway leading to the outside of the housing, a closure for each of said ports, and automatic means for rotating said valve and simultaneously opening the closure for one of said ports and closing the other.

3. A dehydrating apparatus comprising in combination a housing, an air passageway therein, a heating chamber, a heater in said chamber, an air blower in said heating chamber communicating with the ends of the passageway, a ported rotary member intermediate the blower and the air passageway, doors at each end of said passageway communicating with said heating chamber, and means for rotating said ported member whereby to establish communication between the air blower and alternate ends of the passageway and simultaneously to actuate said doors to close the door at one end of the passageway and open the door at the other end.

4. A dehydrating apparatus comprising in combination a housing, an air blower in said housing, complementary movable sections comprising a plurality of trucks movable into engagement with one end of said housing and a header movable into engagement with the ends of the trucks, said housing, header and complementary sections providing dual air passageways communicating with said blower, exhaust ports at each end of said passageways, closures therefor, recirculating ports at each end of said passageways communicating with said blower, closures for said recirculating ports, a rotary valve intermediate said blower and the ends of said passageways, automatic means for imparting a partial rotation to said valve to reverse the direction of air from said blower through said passageways and for actuating the exhaust port closures and recirculating port closures to close said ports at one end of the passageways and to open the ports at the other end of the passageways.

5. A dehydrating apparatus comprising in combination a housing, an air blower in said housing, a plurality of trucks movable into engagement with one end of said housing, a header movable into engagement with the ends of the trucks, said housing, trucks and header providing dual air passageways communicating with said blower, exhaust ports at each end of said passageways, closures therefor, recirculating ports at each end of said passageways communicating with said blower, closures for said recirculating ports, a rotary valve intermediate said blower and the ends of said passageways, time controlled means for imparting a partial rotation to said valve whereby to reverse the direction of air from said blower through said passageways at predetermined intervals and for actuating the exhaust port closures and recirculating port closures to close said ports at one end of the passageways and open the ports at the other end of the passageways.

6. A dehydrating apparatus comprising in combination a stationary housing, a heating chamber therein, a heater in said chamber, an air blower in said heating chamber, a plurality of rows of trucks forming dual passageways movable into engagement with one end of said housing, a header movable into engagement with the ends of the trucks, means for securing the trucks to the housing and means for securing the header to the trucks whereby to provide a unitary structure wherein the side walls of the trucks constitute a portion of the side walls of the structure, an air intake, air filters adjacent said intake and in the path of the incoming air, said stationary housing, trucks and header forming a reverse passageway wherein the air passing in one direction through one row of trucks will return in the opposite direction through another row of trucks to said stationary housing, the air entering said intake passing through said filters to said heating chamber and impelled by said blower through said passageway.

7. A dehydrating apparatus comprising in combination a housing, an air intake in said housing, pivotally mounted louvers adjacent said intake, an air filter and an air heater in the path of the air, an air blower communicating with said intake, a motor for driving said blower and means controlled by said motor for opening said louvers to admit air through said intake upon the starting of said motor and closing said louvers upon the stopping of said motor, a U-shaped dual air passageway communicating with said blower, a reversal valve interposed between said blower and the ends of said passageway for directing the air drawn into the housing by said blower through said passageway first in one direction then in the opposite direction at predetermined intervals, time controlled means for operating said valve, a plurality of open end trucks for the material to be dehydrated, said trucks forming a section of said air passageway, and means for breaking up and equalizing the flow of air through said passageway, and an exhaust for the air at the ends of the passageway.

8. A dehydrating apparatus comprising in combination a stationary housing, an air blower in said housing, a plurality of complementary sections movable into engagement with one end of said housing and each other, transverse rotatable bars extending through said movable sections, latches secured to each end of said bars whereby the latch at one side when actuated will actuate the latch at the other end of the same bar, and pins on the adjacent sections in alignment with said latches cooperating therewith to maintain the sections in locked position.

9. A dehydrating apparatus comprising a housing having a heater, an air blower and a passageway therein, the combination of a rotary ported valve intermediate the blower and the ends of the passageway, time controlled mechanism for rotating said valve to provide a communicating path between the blower and alternate ends of the passageway, recirculating doors adjacent each end of the passageway communicating with said blower, adjustable louvers on each of said doors for regulating the amount of air passing therethrough, said time controlled mechanism simultaneously with the rotating of said valve opening the door at one end of the passageway and closing the door at the other end of the passageway to permit a predetermined amount of air to pass out of one end of the passageway through said louvers for recirculation and preventing the passing of air out of the door at the other end of the passageway.

10. A dehydrating apparatus comprising in combination a stationary housing having an air filter compartment and a heating compartment communicating with each other, air filters in said filter compartment and a heater in said heater compartment, an air blower in said heater compartment, a plurality of air passageways in said stationary housing, a rotatable ported air valve intermediate said blower and said passageways for providing communication between the blower and the passageways, a plurality of rows of open ended movable trucks adapted to be removably connected to said passageways, a movable header having a plurality of complementary passageways, said header being adapted to be removably connected to the ends of said trucks opposite the ends connected to the passageways, means for driving said blower whereby to draw air from said filter compartment past said heater and to impel the same through said valve, passageways, trucks and header and back to said stationary housing, time controlled means for rotating said valve whereby to reverse the direction of the air through said passageways, trucks and header.

11. A dehydrating apparatus comprising in combination a stationary housing having an air filter compartment and a heating compartment communicating with each other, air filters in said filter compartment and a heater in said heater compartment, an air blower in said heater compartment, a plurality of air passageways in said stationary housing, a rotatable ported air valve intermediate said blower and said passageways for providing communication between the blower and the passageways, a plurality of rows of open ended movable trucks adapted to be removably connected to said passageways, a movable header having a plurality of complementary passageways, said header being adapted to be removably connected to the ends of said trucks opposite the ends connected to the passageways, means for driving said blower whereby to draw air from said filter compartment past said heater and to impel the same through said valve, passageways, trucks and header and back to said stationary housing, time controlled means for rotating said valve whereby to reverse the direction of the air through said passageways, trucks and header, exhaust louvers adjacent the ends of the passageways, said louvers being actuated by said time controlled means simultaneously with the rotation of said valve whereby to open the louvers at one end of the passageways to exhaust the air and to close the louvers at the other end of the passageways to prevent the escape of air from that end of the passageways, and recirculating doors at each end of the passageways communicating with the heating compartment, said doors being actuated by said time controlled means simultaneously with the rotation of the valve and the actuating of the said louvers whereby to open the door at one end of the passageway to permit air to pass from that end of the passageways to the heating compartment for reheating and recirculating and simultaneously closing the door at the other end of the passageways to prevent air passing out of that end of the passageways.

WILLIAM JESSUP SHOLAR.